(12) United States Patent
Stringer et al.

(10) Patent No.: US 9,190,018 B2
(45) Date of Patent: *Nov. 17, 2015

(54) VECTOR-BASED CUSTOMIZABLE POINTING INDICIA

(71) Applicant: Freedom Scientific, Inc., St. Petersburg, FL (US)

(72) Inventors: Anthony Bowman Stringer, Tarpon Springs, FL (US); Garald Lee Voorhees, Tampa, FL (US)

(73) Assignee: Freedom Scientific, Inc., St. Petersburg, FL (US)

( * ) Notice: Subject to any disclaimer, the term of this patent is extended or adjusted under 35 U.S.C. 154(b) by 121 days.

This patent is subject to a terminal disclaimer.

(21) Appl. No.: 13/907,282

(22) Filed: May 31, 2013

(65) Prior Publication Data

US 2013/0257721 A1  Oct. 3, 2013

Related U.S. Application Data

(63) Continuation-in-part of application No. 12/828,765, filed on Jul. 1, 2010, now Pat. No. 8,471,870.

(60) Provisional application No. 61/222,709, filed on Jul. 2, 2009.

(51) Int. Cl.
*G09G 5/00* (2006.01)
*G09G 5/08* (2006.01)
*G06F 3/0481* (2013.01)

(52) U.S. Cl.
CPC ............... *G09G 5/08* (2013.01); *G06F 3/0481* (2013.01); *G06F 2203/04806* (2013.01); *G09G 2340/045* (2013.01)

(58) Field of Classification Search
CPC combination set(s) only.
See application file for complete search history.

(56) References Cited

U.S. PATENT DOCUMENTS

| 6,731,315 | B1 | 5/2004 | Ma et al. |
| 2005/0088410 | A1 | 4/2005 | Chaudhri |
| 2005/0285880 | A1 | 12/2005 | Lai et al. |
| 2006/0267982 | A1* | 11/2006 | Aguera y Arcas ............ 345/428 |
| 2007/0013722 | A1 | 1/2007 | Souza |
| 2007/0013723 | A1 | 1/2007 | Souza et al. |

(Continued)

FOREIGN PATENT DOCUMENTS

| JP | 11149335 | 6/1999 |
| JP | 11203018 | 7/1999 |

OTHER PUBLICATIONS

Algorithmic Implementations, Inc., ZoomText 8.1 User's Guide, 2004, pp. 38-47.

(Continued)

*Primary Examiner* — Leon T Cain, II
(74) *Attorney, Agent, or Firm* — Anton J. Hopen; Andriy Lytvyn; Smith & Hopen, P.A.

(57) ABSTRACT

A method of rendering customized pointing indicia including the steps of monitoring application program interface messaging and intercepting a call for a unique system pointer identifier. A stored collection of predefined vector shapes is accessed, from which a predefined vector shape is selected correlated to the current system pointer identifier. The stroke and fill attributes are set for the vector shapes. A sequence of rasterized frames of vector shapes having different attributes are created and displayed to produce animated pointing indicia effect. The customized vector shape is rasterized and displayed to an end user operating a computer. Customization, animation, and magnification of pointing indicia are performed responsive to user input, which may be a touchscreen event, body movement, hand gesture, mouse event, or a key stroke.

20 Claims, 18 Drawing Sheets

(56) References Cited

U.S. PATENT DOCUMENTS

| | | | |
|---|---|---|---|
| 2007/0159499 A1* | 7/2007 | Sinclair et al. | 345/660 |
| 2007/0192718 A1 | 8/2007 | Voorhees et al. | |
| 2007/0198942 A1 | 8/2007 | Morris | |
| 2009/0122085 A1* | 5/2009 | Iijima | 345/660 |
| 2010/0083192 A1* | 4/2010 | Zaman et al. | 715/866 |
| 2011/0004887 A1 | 1/2011 | Stringer et al. | |

OTHER PUBLICATIONS

Lewis, Personal Computers; A Mouse That Does More Tricks, New York Times, Apr. 27, 1993, p. C11.

JIJI Press Ltd., NEC Launches New Software to Magnify PC Screen Text, JIJI Press Eng. News Serv., Jul. 8, 2004.

International Search Report of PCT/US2010/040753 (filing date of Jul. 1, 2010) and a mailing date of Jan. 24, 2011; Applicant: Freedom Scientific, Inc. et al.

Preliminary Report of Patentability for PCT/US2010/040753 (filing date of Jul. 1, 2010) and a priority date of Jul. 2, 2009; Applicant: Freedom Scientific, Inc. et al.

International Search Report and Written Opinion issued Sep. 24, 2014 for corresponding PCT International Application No. PCT/US2014/040475 with an international filing date of Jun. 2, 2014.

* cited by examiner

VECTOR-BASED CUSTOMIZABLE POINTING INDICIA

CROSS REFERENCE TO RELATED APPLICATION

This application is a continuation-in-part of U.S. patent application Ser. No. 12/828,765, entitled "VECTOR-BASED MAGNIFIED POINTER," filed Jul. 1, 2010 and claiming a priority date of Jul. 2, 2009, which is herein incorporated by reference.

FIELD OF INVENTION

This invention relates to customization of computer display interfaces, and more specifically, to customization of pointing indicia therein.

BACKGROUND OF THE INVENTION

Low vision individuals often require customization of computer screen interfaces to discern text and images. Customization systems may be built into the operating system itself or may comprise feature-rich, third-party products such as those sold under the MAGIC brand manufactured by Freedom Scientific, Inc., based in St. Petersburg, Fla.

A deficiency in the current state of the art is that of scaling pointing indicia such as a cursor or caret from small to large dimensions. For example, all mouse pointers have a discrete minimum and a common maximum size. The minimum size is a multiple of the system metrics for the mouse pointer. Generally, this metric is a 32×32 pixel square under operating systems sold by Microsoft Corporation out of Redmond, Wash. under the brands WINDOWS 7, VISTA, and XP. However, it is common for a mouse pointer to only occupy a 16×16 square, top-left justified, within this metric.

When the screen is magnified to a high level, such as 16-fold, the mouse pointer becomes pixelated and distracting to the user. Various smoothing techniques may be applied to reduce pixelation, but such processes consume CPU cycles and still lead to imperfect results. A serious problem with presenting a jugged and pixelated pointing indicia to a low vision user is that such flaws may undermine the confidence of a low vision user in her ability to see clearly: the user may be in doubt on whether the flaws are introduced through magnification of the pointing indicia are whether the poor vision of the user is the cause of the perceived imperfections.

Yet another deficiency is limited customization of pointing indicia. Some low vision users have difficulty distinguishing certain colors making it burdensome—or even impossible—to identify and observe the movement of the pointing indicium as it navigates a computer screen. Accordingly, what is needed is a vector-based pointing indicium whose outlining border and body may be independently colorized to enable the low vision users to better distinguish the pointing indicium from the background content of the screen.

Finally, although animation of pointing indicia is well known in the art, animation of a pixelated cursor—especially at higher magnification levels—suffers from the same flaws as described above. Therefore, there exists a need for a method of animating a vector-based pointing indicia.

SUMMARY OF INVENTION

The ability to smoothly scale, animate, or customize a mouse pointer or other graphical element is greatly enhanced by using vector-based images to create the initial, cached rasterized images that are ultimately used for final rendering (drawing to the screen). The reason for this is that the shapes and elements of the vector-based images are described by a formula, rather than by a bitmap. Currently, all mouse pointers are described by bitmaps. Bitmaps inherently become "blocky" and "stair-stepped" when magnified. Although there are post-scaling treatments that can be applied to artificially "smooth" a scaled bitmap, they are incapable of producing images that are as crisp and sharply edged as images produced from a scaled vector image.

An embodiment of the present invention provides a method of rendering a customized (i.e. colorized) pointing indicia. The method includes the steps of monitoring application program interface messaging, intercepting a call for a current system pointer identifier (such as its handle), accessing a stored collection of predefined vector shapes, and selecting a predefined vector shape correlated to the system pointer identifier from the collection of vector shapes. Predetermined stroke attributes are set for the selected vector shape, which is then rasterized and displayed as the pointing indicium. Some stroke attributes include color, opacity, width, line cap, line join, and dashing.

In an embodiment of the invention the desktop color under the hotspot for the pointing indicia is retrieved and the stroke is automatically modified to provide contrast of the boundary between the outer portion of the pointing indicia and the background. For example, a pure white background in RGB values would be 255,255,255. If the stroke color for a cursor was initially set by the user as white then the stroke would visually disappear when the pointing indicia was moved over a white background. For illustrative purposes, the background RGB and stroke RGB values are monitored in real time. If the sum of the positive integer differences between each RGB value was less than a threshold value, then the current software would automatically modify the stroke color to provide contrast. For example, if the threshold was set to an aggregate 150 then a background RGB value of 205,205,205 (light gray) would trigger an automatic change in the stroke color. By the same function, RGB values of 105,255,255 (teal) and 245,245,125 (yellow) would also trigger an automatic change because they do not sufficiently contrast from a white background. When the threshold is detected, the next step is to automatically change the stroke value. This can be done by any function that will distinctly change the RGB values. RGB values range from 0 to 255. Therefore, in our first example of 205,205,205 (light gray) we can assign a simple function to subtract 75 if the value is above 127 or add 75 if the value is below 127. Thus, 205,205,205 becomes 130,130,130 which is a dark gray and would contrast well on a white background. The 105,255,255 teal color stroke would automatically change to 180,130,130 which is brown (contrasting well over white).

An advantage of this feature is that the main body of the pointing indicia remains constant while the stroke value is variable so it doesn't blend into the background. Thus, the fill does not change colors responsive to the desktop background which could be visually distracting but the end user maintains a clear understanding of the boundaries of the pointing indicia by modification of only the stroke color. Another embodiment of the invention provides for customization of the pointing indicia by setting predetermined fill attributes for the vector shape prior to rasterizing, thus customizing the appearance of the body of the pointing indicia. Fill attributes include color and opacity.

In an embodiment, after the step of selecting a predefined vector shape corresponding to the current system pointer identifier, a set of rasterized frames is created based on the selected vector shape. Each rasterized frame has differing attributes, such as stroke and fill attributes and magnification level. The frames are displayed sequentially for a predetermined duration to render an animated pointing indicium.

In some embodiments of the invention, customization, animation, and magnification of the pointing indicia are performed responsive to user input. The user input may be of various types including the following: a key stroke, a mouse-wheel event, a mouse movement, various types of touch-screen input, user's hand gestures, body movement, facial expressions, voice commands, etc. To have a capability of detecting such user inputs the electronic device on whose screen the pointing indicium is being magnified may need to be equipped with a touchscreen, a keyboard, a mouse, a structured light scanner, and/or a microphone.

Instead of, or in addition to, passively intercepting a call for a current system pointer identifier, the operating system may be actively polled as to its current settings and the current system pointer identifier may be resolved.

To facilitate efficiency and responsiveness, previously rasterized shapes having customized stroke and fill attributes and magnification levels may be stored and recalled via a cache without having to customize, scale, and rasterize the shapes again. Storage of shapes is typically performed on available storage devices which may include, but are not limited to, magnetic hard drives, solid state drives, and/or RAM.

The invention may be embodied in one or more non-transitory computer-readable media having computer-executable instructions for performing a method of running a software program on a computer. The instructions stored on the non-transitory computer-readable media may be executed as an application, distinct from an operating system upon which it runs and interacts at a display driver level to modify screen output. Alternatively, the non-transitory computer-readable media may include an operating system, or update thereto, to achieve the novel functionality of the present invention.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1:
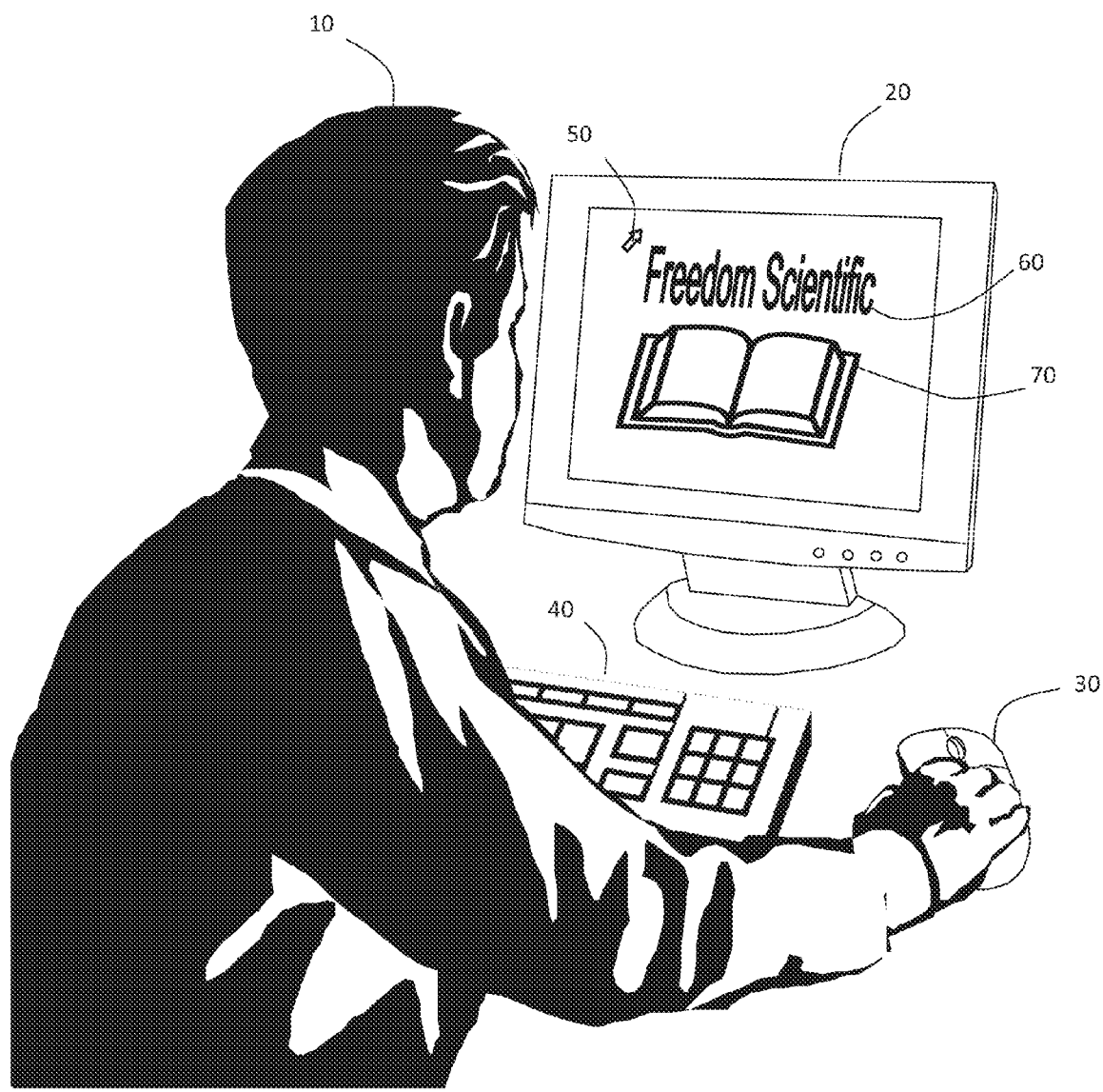
FIG. 1 is a conceptual view of an embodiment of the invention showing a low-vision user viewing a screen at 1-fold magnification.

Turning now to FIG. 1, low vision user 10 manipulates views on monitor 20 via mouse 30 and keyboard 40. Pointing indicium 50 is shown as an arrow cursor for exemplary purposes but could also be a caret. A cursor is the graphical image that represents the mouse and its movements on a Cartesian coordinate plane. It can take many shapes including, but not limited to, an arrow for pointing, a hand, an hourglass, or an I-shaped text selector. The caret, on the other hand, is the blinking indicia that is used to enter text. When low vision user 10 types on keyboard 40, the letter appears as a caret, and the caret moves forward by 1 space. To view the relative magnification levels, display text 60 and display graphic 70 are provided in FIG. 1.

Figure 2:
FIG. 2 is a conceptual view of an embodiment of the invention showing a low-vision user viewing a screen at 2-fold magnification.
Figure 3:
FIG. 3 is a conceptual view of an embodiment of the invention showing a low-vision user viewing a screen at 4-fold magnification.
Figure 4:
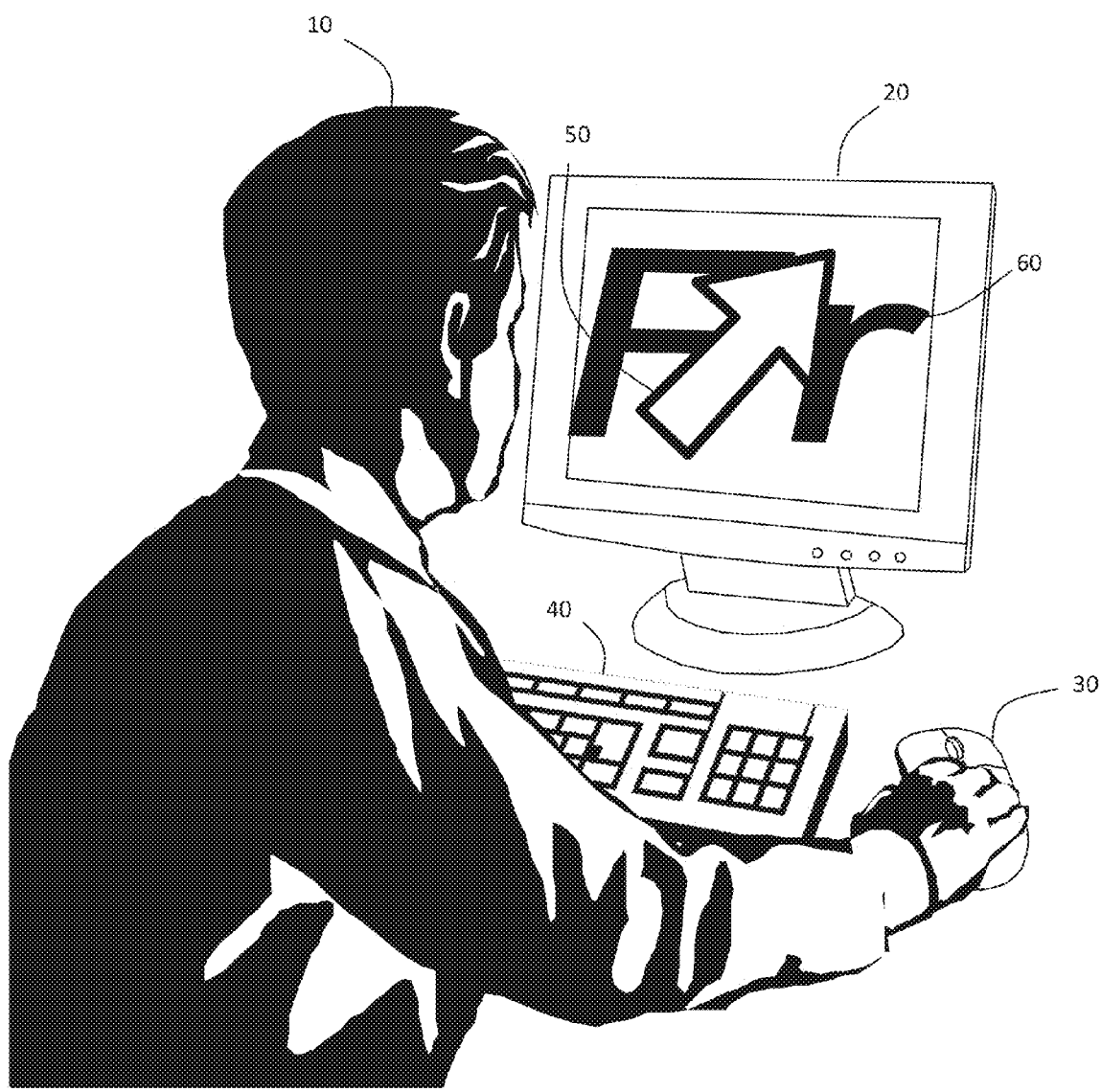
FIGS. 4-5 are a conceptual views of an embodiment of the invention showing a low-vision user viewing a screen at 16-fold magnification.

FIG. 1 shows the GUI, pointing indicia 50, display text 60 and display graphic 70 unmagnified. In FIG. 2, pointing indicia 50, display text 60 and display graphic 70 are shown conceptually at a 2-fold magnification level. In FIG. 3, pointing indicia 50, display text 60 and display graphic 70 are shown conceptually at a 4-fold magnification level. In FIG. 4, pointing indicia 50, display text 60 and display graphic 70 are shown conceptually at a 16-fold magnification level. At this level, pointing indicia 50 overlaps approximately twenty percent of the GUI area. According to an embodiment of the present invention, additional magnification of GUI and display text 60 de-couples the previously synchronized magnification of GUI and pointing indicia 50. The size of pointing indicia 50 remains constant as the magnification of display text 60 continues past 16-fold magnification.

Figure 5:
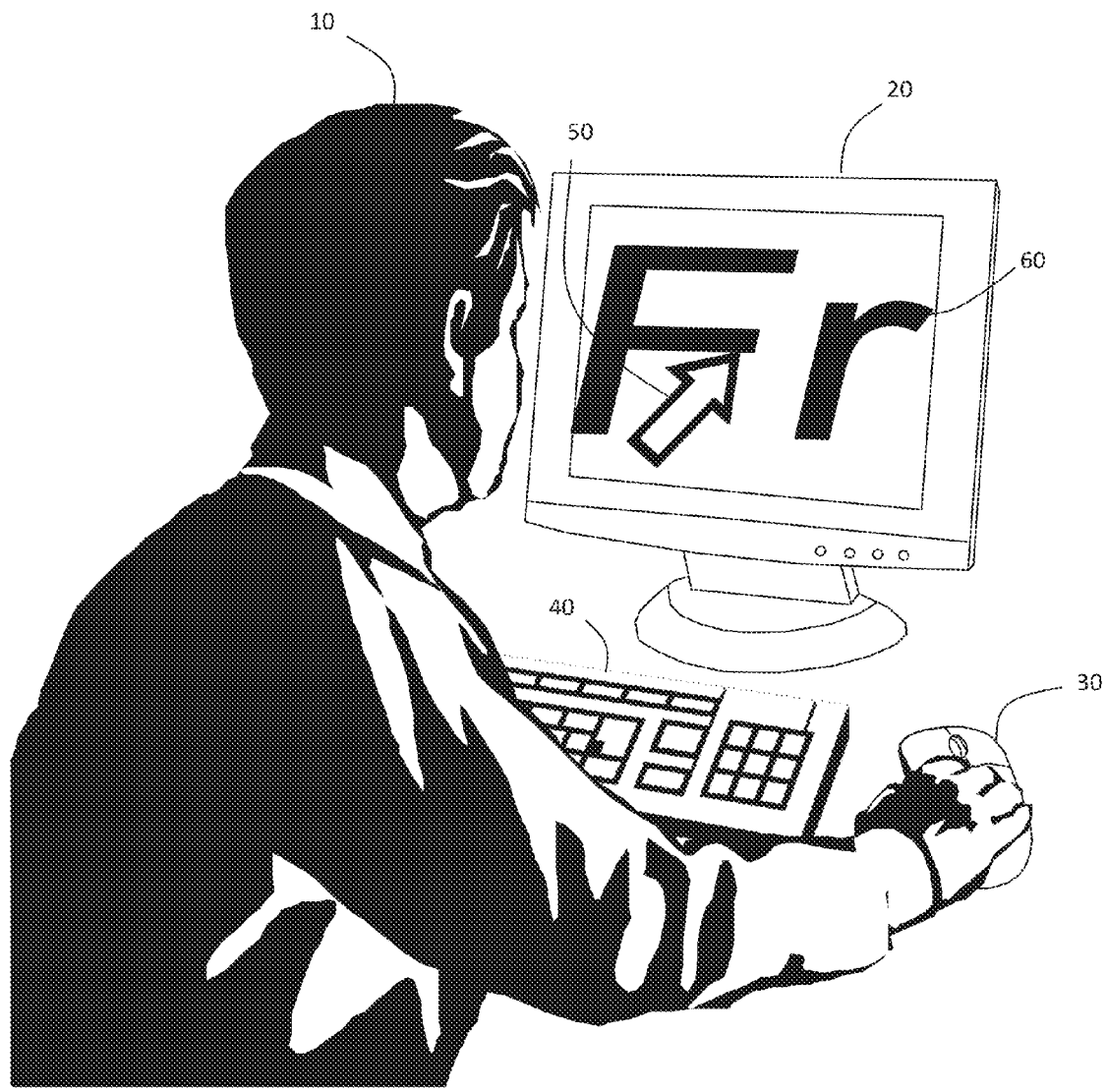

In FIG. 5, the magnification of the pointing indicia 50 is de-coupled from the magnification of the GUI. GUI is magnified to 16-fold while pointing indicia 50 is magnified to only 4-fold. Low vision user 10 may de-couple magnification between pointing indicia 50 and GUI using keyboard 40, mouse 30, or a combination thereof. Other peripherals and input systems such as voice recognition systems may be used to effectuate the event. The de-coupling may also be automatically and intelligently achieved by the invention. For example, a predetermined threshold of mouse inactivity may be detected to incrementally increase or decrease (as desired) pointing indicia 50 magnification.

Mouse inactivity with extrinsic data may be used to make intelligent magnification decisions. For example, if a large amount of text is detected on the GUI in conjunction with mouse inactivity, a presumption may be made that the user is reading the text. In such case, a highly magnified cursor would only obscure text viewing. Alternatively, mouse 30 movement immediately after a period of mouse inactivity may invoke a rapid, stepped magnification of the pointing indicia 50 so that it can be easily located by low vision user as he resumes use of pointing indicia 50. The stepped magnification may be used to provide an animated effect. In other cases, a plurality of incrementally modified vector shapes may provide other animation effects such a movement, rotation, waveforms and the like. As the shapes are vector-based, sized up to the magnification level, rasterized and cached, the quality of the graphic and the efficiency of cycling the cached images provide a substantial advantage over the current state of the art.

Yet another embodiment of the invention includes the step of algorithmically detecting erratic movements of mouse 30 by low vision user 10 following a period of mouse 30 inactivity which is indicative of difficulty in find the location of pointing indicia 50. Erratic movement may include, but are not limited to, rapid side-to-side movement and circular movement. Responsive to detection of erratic movements, pointing indicia 50 is magnified according to the invention for a predetermined time period then returned to its preselected magnification level. An advantage of this embodiment over the prior art is that erratic movement must follow a predetermined period of inactivity as mouse movement perceived as "erratic" may be intentional should the user be engaged in a software application that calls for such movement.

Figure 6:
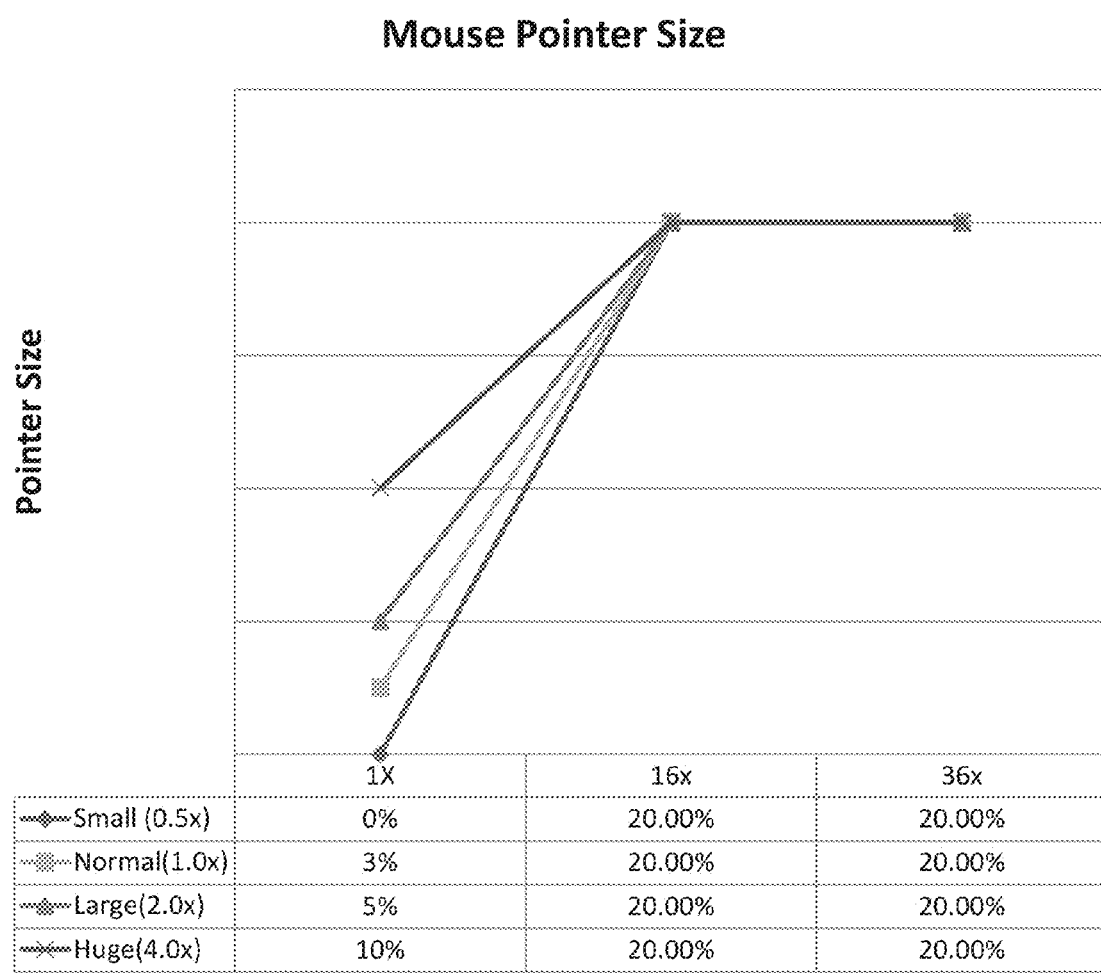
FIG. 6 is a graph showing a convergence point for maximum pointer indicia size at 16-fold magnification.

FIG. 6 illustrates a convergence graph showing four (4) different pointer sizes denoted as small (♦), normal (■), large (▲) and huge (X). Small pointer size value is 0.5×. Normal pointer size value is 1.0×. Large pointer size value is 2.0×. Huge pointer size value is 4.0×. At a 1-fold magnification of the GUI, small, normal, large and huge pointer sizes cover an area of the GUI of ~0%, 3%, 5% and 10% respectively. As magnification of the GUI is increased, the variation in point sizes would produce drastically different user experiences. However, under an embodiment of the present invention, these pointer sizes are normalized at a 16-fold GUI magnification. As the GUI is magnified from 1-fold to 16-fold, small pointer size is increased substantially more relative to huge pointer size. Other magnification levels may also be selected for convergence.

Figure 7:
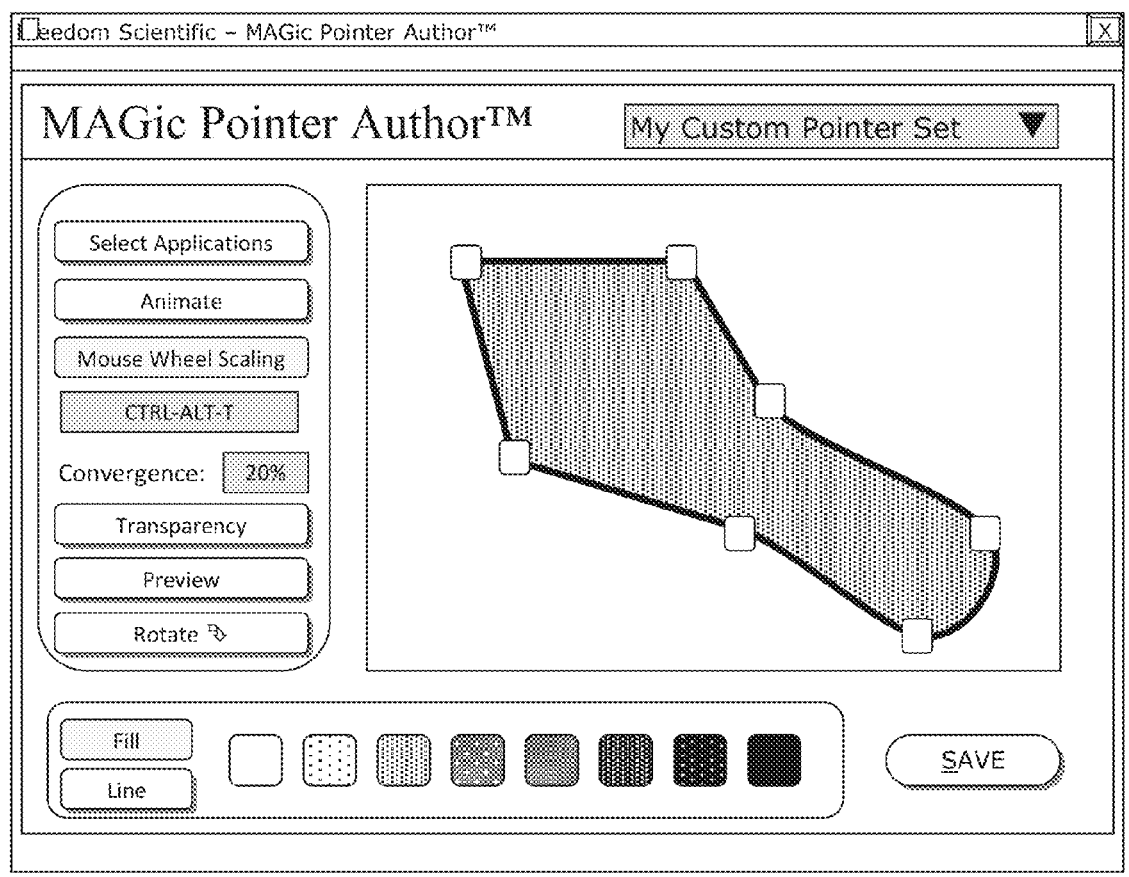
FIG. 7 is a graphic user interface for customizing a mouse pointer.

Turning to FIG. 7, a pointer authoring application is anticipated by the present invention to enable users to create vector shapes and assign them to pointer sets or individual pointers. Pointer sets contain collections of different graphic images for pointer cursor that change depending on the circumstances in which they are displayed. When selecting text to edit, a cursor may change to a vertical bar (I-beam). When panning around a document, the cursor may appear as a hand. Graphic-editing cursors may appear as pencils, brushes and paint buckets depending on the function. When waiting for an operation to finish, a "wait" image may appear such as an hourglass or clock. Other pointing options include selecting fill and line appearances for color, patterns, transparency and the like. Shapes may be assigned specific software applications. This may be accomplished by inspecting the operating system messaging to identify which application gains focus and applying the appropriate pointer set and/or cursor modification as desired. Because the present method allows the rapid, clean rendering of sharp and clear images at any dimension, animating the pointer cursor is possible. A sequence of stylizations and/or changes in dimension in the vector shape may be cached whereby the cursor may appear animated as the sequence is displayed. Mouse wheel scaling parameters and hot-key combinations may be assigned to specific shapes and/or sets. For example, a user may hold down a keyboard combination while scrolling the mouse wheel in different directions to scale up or down the pointer cursor.

Figure 8:
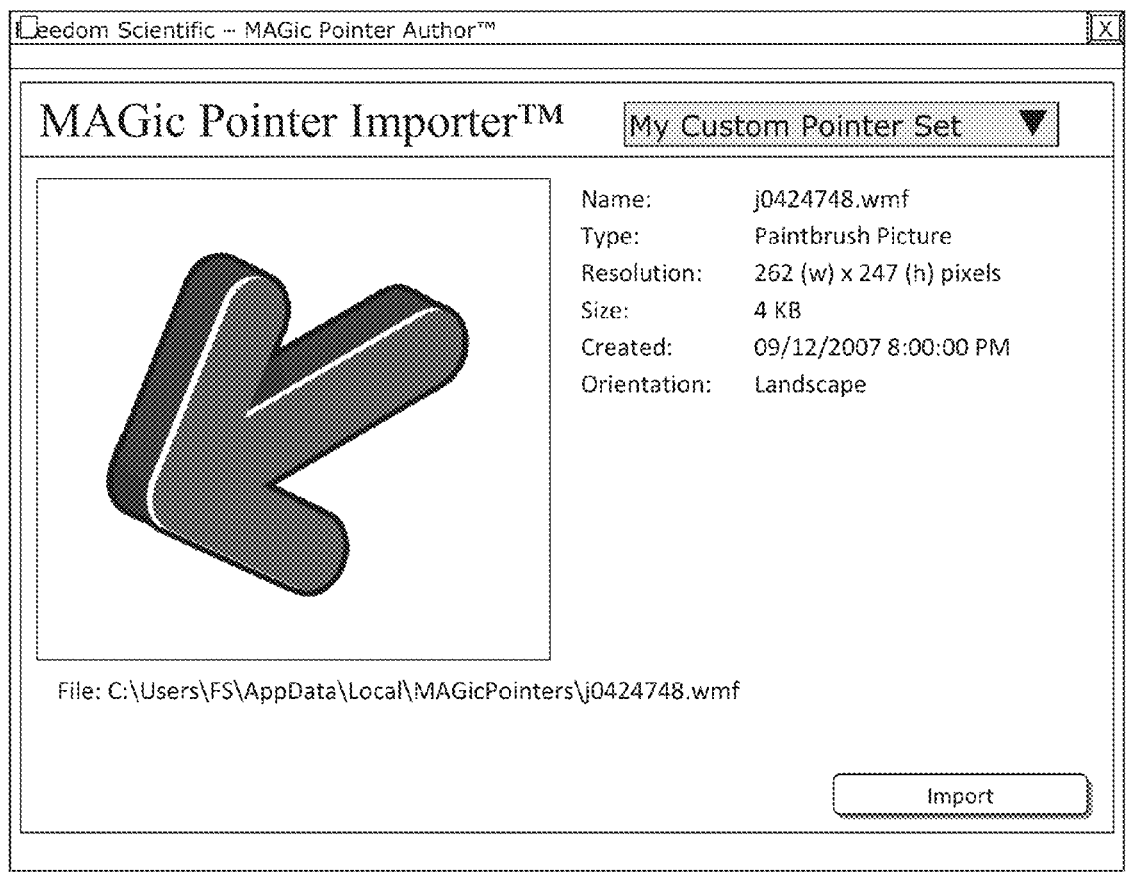
FIG. 8 is a graphic user interface for importing vector based files and assigning them as pointing indicia.

FIG. 8 shows an import application for assigning any vector-based graphic file to a specific pointer and/or pointer set. Vector file formats may include, but are not limited to, computer graphics metafile (CGM), scalable vector graphics (SVG), OpenDocument graphics (ODG), encapsulated postscript (EPS), portable document format (PDF), small web format (SWF), Windows metafile (WMF), Windows enhanced metafile (EMF), and XML paper specification (XPS). Another advantage of the present invention is that low-vision users are more likely to have a large collection of preexisting vector art to utilize as pointing indicia at any magnification level. In contradistinction, rasterized images are difficult to increase in size while maintaining clarity and sharpness due to pixelation of the bit-mapped image.

Figure 9:
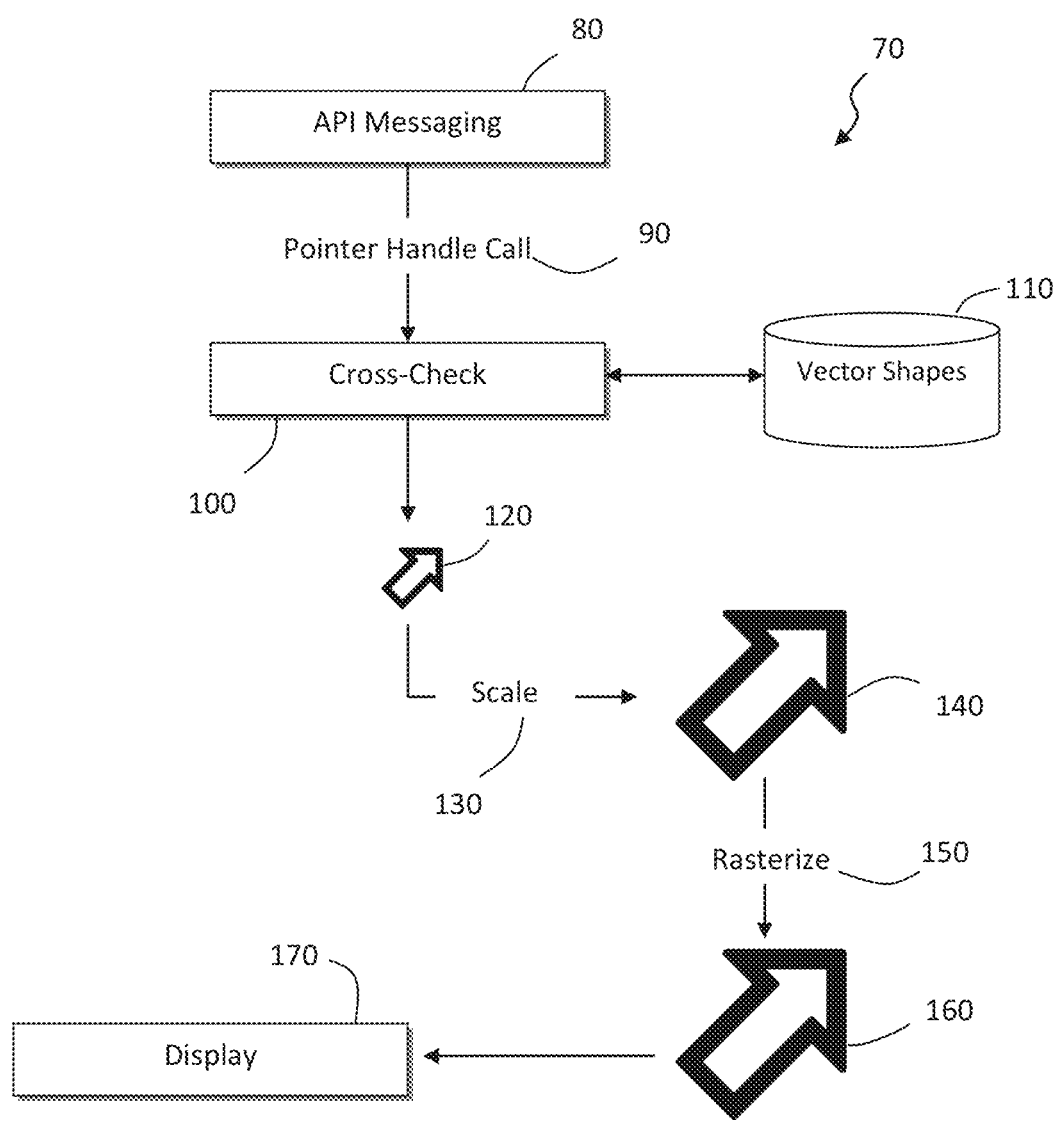
FIG. 9 is a diagrammatic view of an embodiment of the invention.

In FIG. 9, an embodiment of the invention is shown as process 70. API messaging 80 is monitored for pointer handle call 90. Cross-check 100 is made against vector shape database 110 to match pointer handle call 90 with a preexisting shape in vector shape database 110. Vector shape database 110 contains one or more vector shapes stored in memory. Database 110 may be a file directory, a structured file such as XML, a fully relational database or the like. Vector shape database 110 associates pointer handle call 90 with a correlated vector image. For example, if pointer handle call 90 requests a hand cursor image, cross-check 100 determines whether a vector image exists for the hand cursor image. If not, then a bit-mapped image is scaled up and smoothed. However, if a vector image does exist, then it is scaled up to the appropriate magnification level and then rasterized into a bitmap. Vector shape 120 is retrieved and scaling function 130 is applied to produce magnified vector shape 140. Scaling is performed on a vector image by increasing or decreasing the length and width of the image. Because the scaling is done on a vector image, there is no pixelation as would be seen in bit-mapped scaling. Rasterizing process 150 is applied to magnified vector shape 140 to produce rasterized shape 160 which is then displayed 170 as the pointing indicia.

Figure 10:
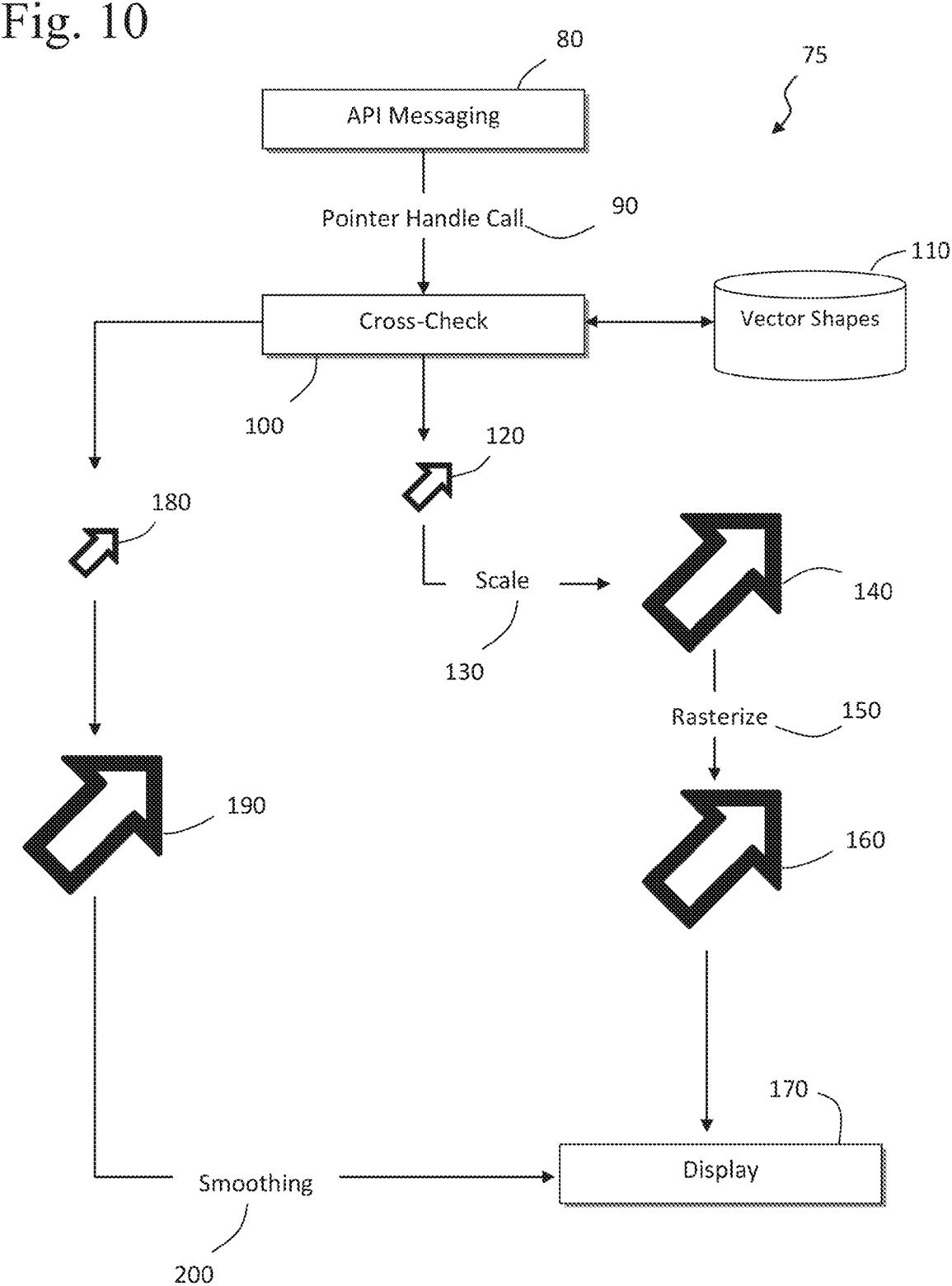
FIG. 10 is a diagrammatic view of an embodiment of the invention.

FIG. 10 illustrates an alternative embodiment of the invention (denoted as process 75) that accommodates pointer handle calls 90 that do not have a corresponding shape in vector shape database 110. In the event a match is not made, default bitmapped pointing indicia 180 is magnified to enlarged bitmapped pointing indicia 190. Smoothing processing 200 is applied to enlarged bitmapped pointing indicia 190 and then displayed 170. In another embodiment of the invention, upon finding no match for a vector shape, the system prompts low vision user 10 to associate an existing vector shape, create a new vector shape or import a vector-based file as a replacement for default bitmapped pointing indicia 180. In yet another embodiment of the invention, a default vector shape is provided for pointer handle calls 90 that lack a corresponding shape in vector shape database 110.

Figure 11:
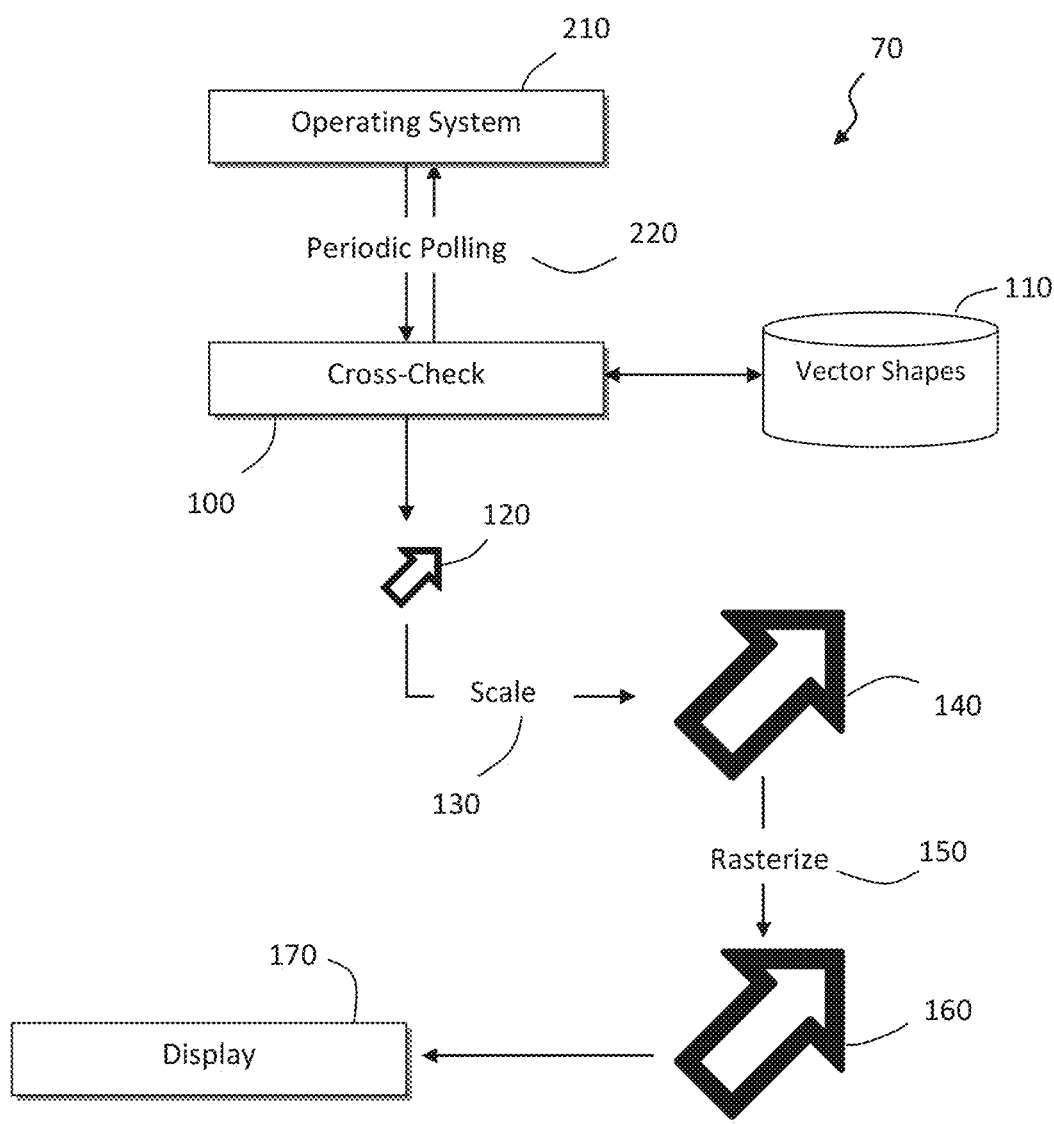
FIG. 11 is a diagrammatic view of an embodiment of the invention showing periodic polling of the operating system to obtain the current pointing indicia settings.

FIG. 11 illustrates periodic polling 220 of operating system 210 to obtain the current pointing indicia settings. Upon retrieving these settings, the predefined vector shape is selected that is correlated with the polled indicia settings.

Figure 12:
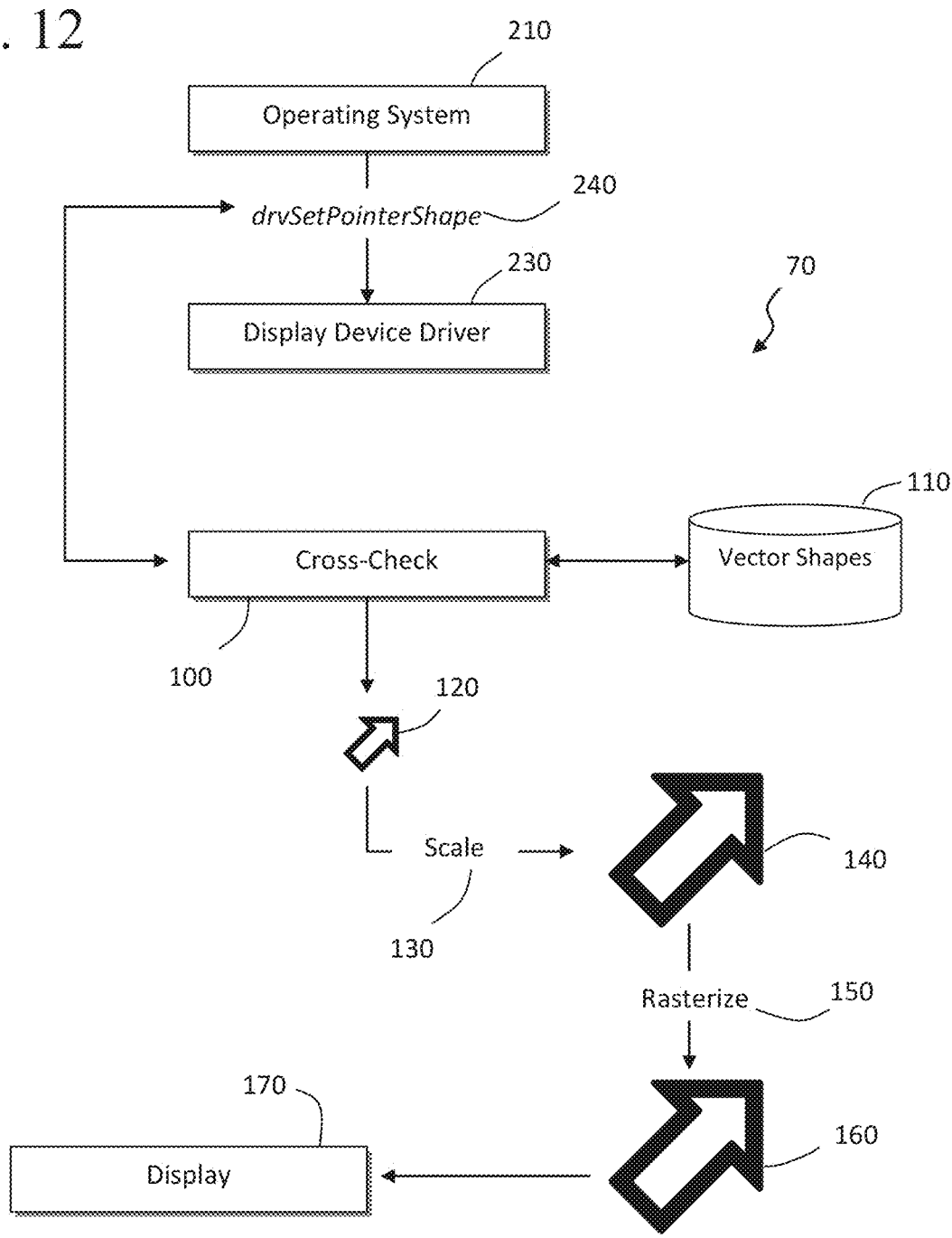
FIG. 12 is a diagrammatic view of an embodiment of the invention showing interception of dvrSetPointerShape between the operating system and the display device driver to obtain the current pointing indicia settings.

In FIG. 12, an alternative method of obtaining the pointer shape includes the step of intercepting drvSetPointerShape value 240 between operating system 210 and display device driver 230. The drvSetPointerShape value 240 is cross-checked 100 to see if there is a correlated vector shape 110 that is indexed to drvSetPointerShape value 240. Using drvSetPointerShape value 240 is most appropriate for the fifteen (15) predefined (non-obsolete) cursor types available in the MICROSOFT WINDOWS application programming interface specification.

Figure 13:
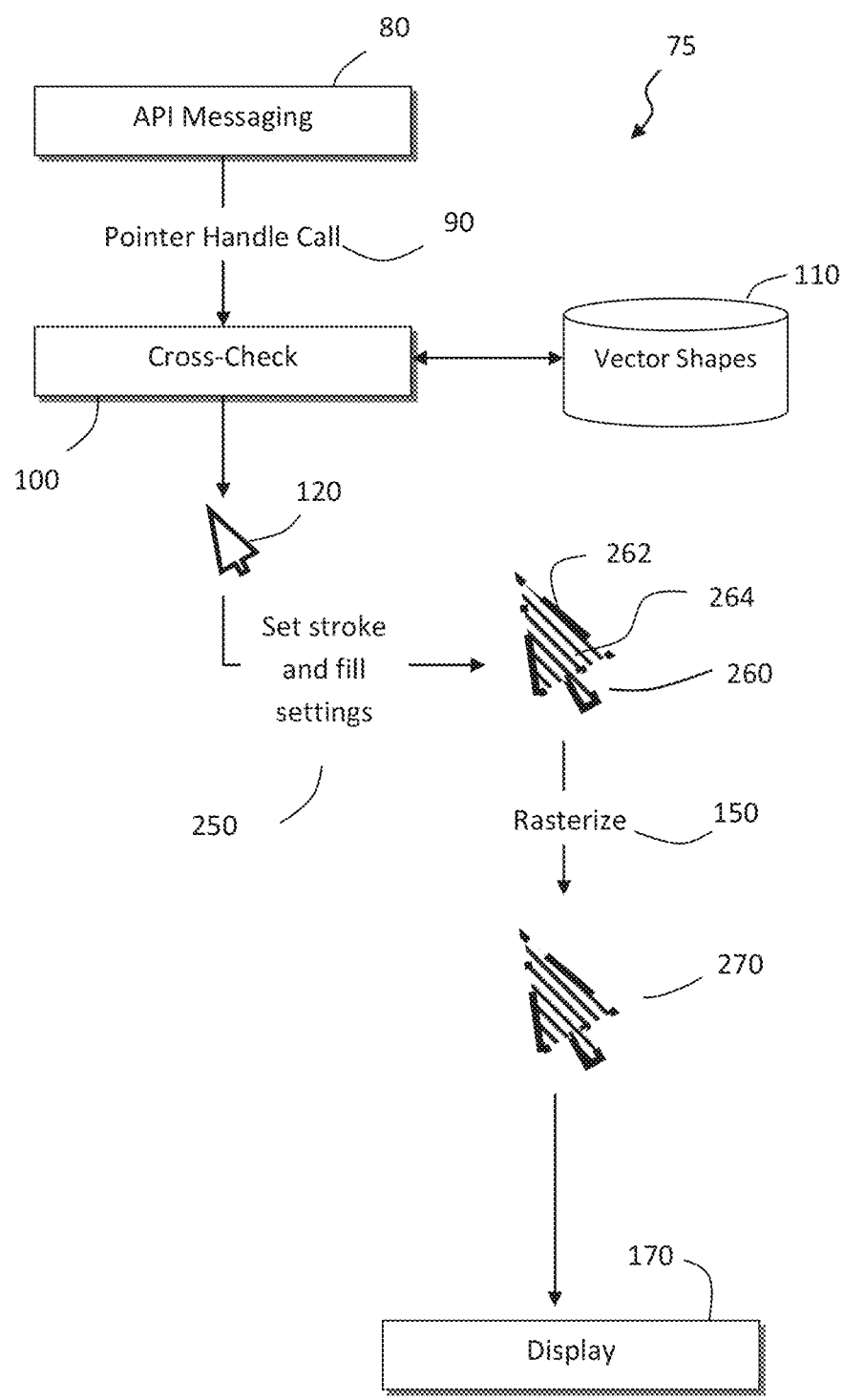
FIG. 13 is a diagrammatic view of an embodiment of the invention showing customization of the pointing indicia.

FIG. 13 illustrates an embodiment of the invention, according to which, stroke 262 and fill 264 are customizable. In step 250, attributes of stroke 262 and fill 264 of vector shape 120 are set to produce a customized vector shape 260. Rasterizing process 150 is applied to customized vector shape 260 to create a rasterized customized vector shape 270, which is then displayed in step 170 as the pointing indicium. The most significant attribute of stroke 262 and fill 264 is color because certain color combinations are easier to perceive and observe for extended periods of time, which may be especially beneficial for visually impaired users. Other attributes of stroke 262 include the following: opacity, width, line cap, line join, and dashing; the opacity of fill 264 may also be adjusted.

Figure 14:
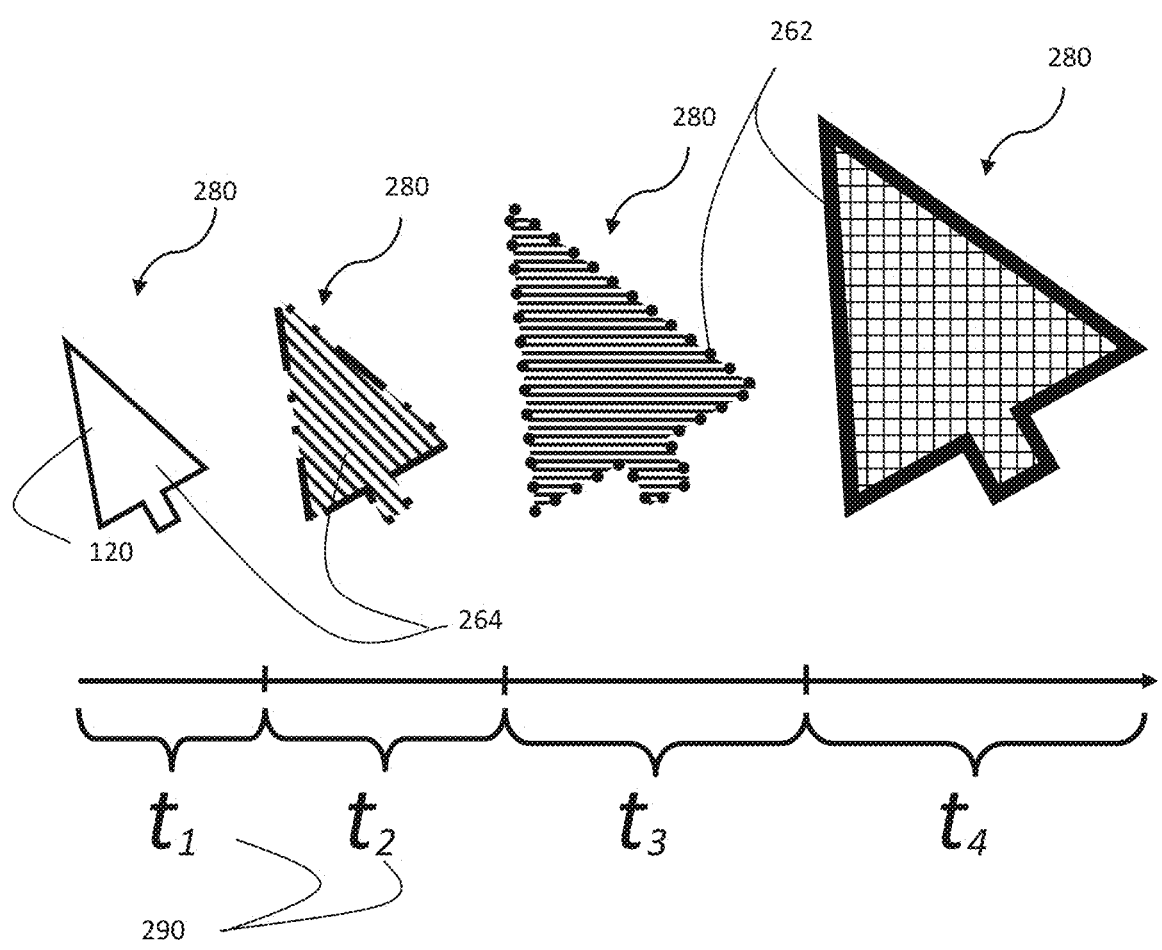
FIG. 14 is a depiction of a sequence of four frames of a pointing indicium vector shape, each frame having differing stroke, fill, magnification attributes, and a predetermined duration time.

FIG. 14 illustrates an embodiment of the invention according to which the pointing indicia may be animated. The animation involves creating a sequence of rasterized frames 280 of vector shape 120. Attributes of each subsequent rasterized frame 280 differ from those of preceding rasterized frame 280—these attributes include stroke 262, fill 264, and/or magnification level. A predetermined time duration 290 is associated with each rasterized frame 280. To produce the animation effect, rasterized frames 280 are displayed sequentially, wherein each rasterized frame 280 is displayed for corresponding time duration 290. In some embodiments, time durations 290 may be identical for all rasterized frames 280, whereas in alternative embodiments, certain rasterized frames 280 may be displayed for a longer duration than others. The sequence of rasterized vector images may be stored in a graphics filed format compatible with the operating system of choice. For example, the ANI file format is used for animated mouse cursors on the MICROSOFT WINDOWS operating system. The ANI file format is based on the MICROSOFT RIFF file format (resource interchange file format) which is used as a container for storing the individual frames. A preferred file format will contain the default frame rate, sequence information (order of rasterized vector images), cursor hotspot and the individual frames (rasterized images into the ICO bitmap format). In addition, individual frame rates for each image within the sequence may be set.

Figure 15:
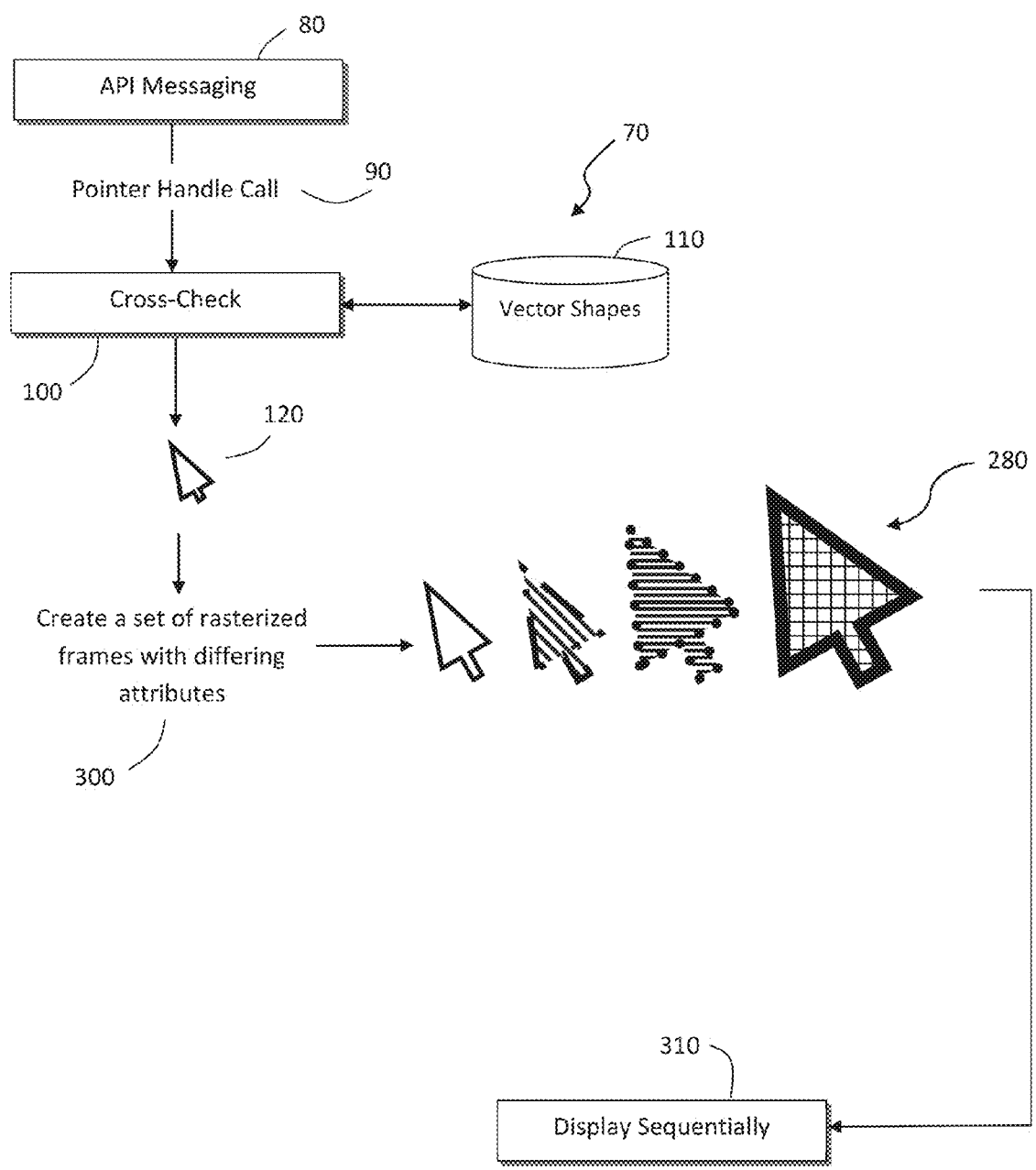
FIG. 15 is a diagrammatic view of an embodiment of the invention showing animation of the pointing indicia.

The method of animating a vector-based pointing indicium is diagrammatically illustrated in FIG. 15. After pointing indicium vector shape 120 is selected, a set of rasterized frames 280 with differing attributes of vector shape 120 are created in step 300. Rasterized frames 280 are then displayed sequentially in step 310 rendering an animated pointing indicium.

Figure 16:
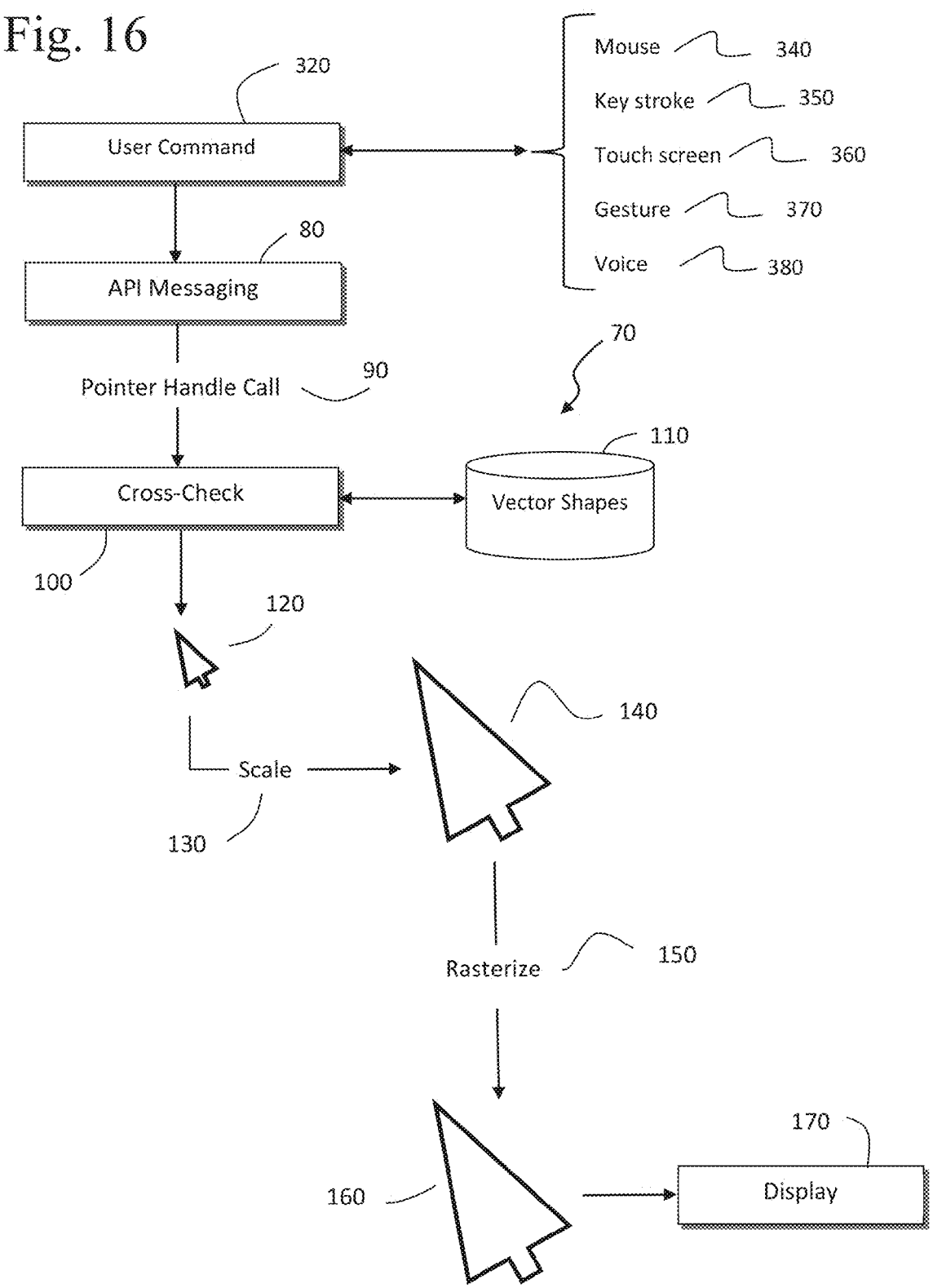
FIG. 16 is a diagrammatic view of an embodiment of the invention showing magnification of a pointing indicium responsive to user input.

Various embodiments of the invention described above may be performed responsive to a specific user input. FIG. 16 diagrammatically illustrates an embodiment in which vector-based pointing indicia are magnified responsive to a user input 320. User input 320 may be received as a mouse event 340, a key stroke 350, a touchscreen event 360, a gesture 370, a voice command 380, or a combination thereof.

Figure 17A:
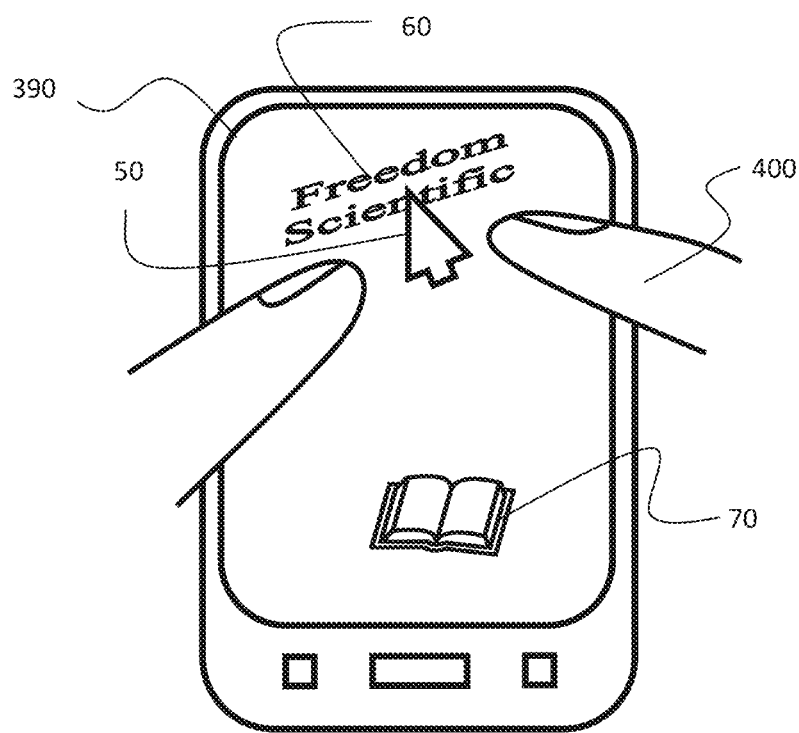
FIGS. 17A-B are a conceptual view of an embodiment of the invention where the user input is received via a touchscreen.
Figure 17B:
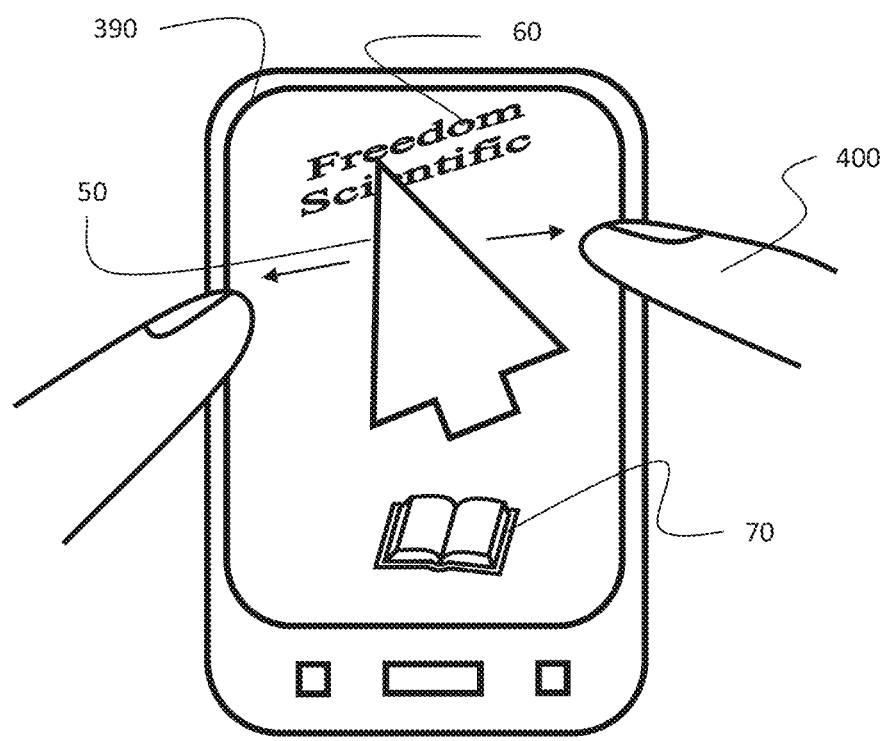

FIGS. 17A-B illustrate an example of touchscreen event 360. The user may use this type of input with any device having a touchscreen 390. In the example shown in FIGS. 17A-B, user's fingers 400 simultaneously contact touchscreen 390 and slide apart while maintaining contact with the surface of the touchscreen 390. As shown in FIG. 17B, responsive to touchscreen event 360, pointing indicium 50 may be magnified independently of display text 60 and display graphic 70 according to the process diagrammatically depicted in FIG. 16. In alternative embodiments, magnification of display text 60 and/or display graphic 70 may be coupled with magnification of pointing indicia 50. Alternatively, touchscreen event 360 may be in a form of a touch-hold, a touch-tap, a touch-drag, a touch-flick, a pinch, a multi-touch, a touch gesture pattern, a stencil input, etc.

Figure 18A:
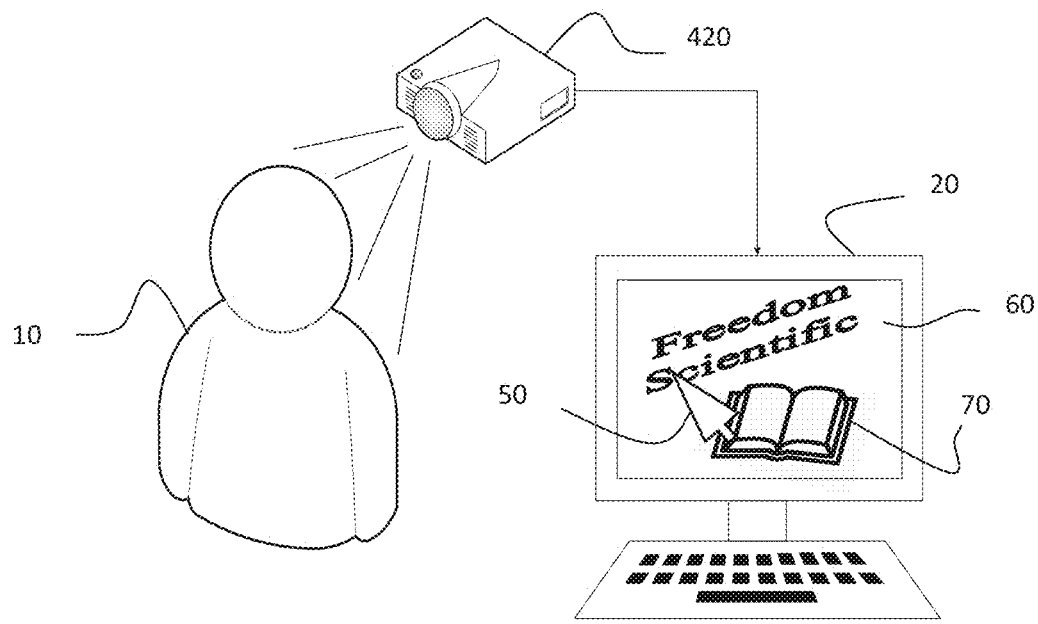
FIGS. 18A-B are a conceptual view of an embodiment of the invention where the user input is received via a structured light scanner.
Figure 18B:
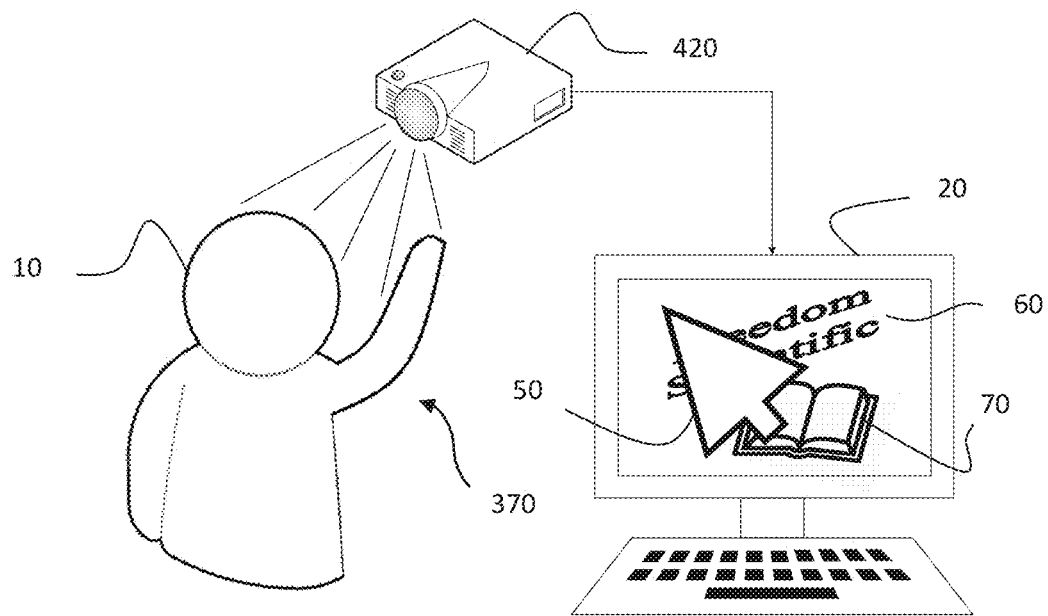

According to an embodiment of the invention depicted in FIGS. 18A-B, gestures 370 are received via a structured light scanner 420. Structured light scanners 420, such as MICROSOFT KINECT, are known in the art and are used to identify a variety of gestures 370. FIGS. 18A-B illustrate magnification of vector-based pointing indicium 50 responsive to gesture command 370. When user 10 raises an arm, structured light scanner 470 identifies gesture 370. Responsive to gesture 370, vector based-pointing indicium 50 is magnified according to the process diagrammatically depicted in FIG. 16. In the embodiment shown in FIGS. 18A-B, pointing indicium 50 is magnified independently of display text 60 and display graphic 70. In alternative embodiments, magnification of pointing indicia 50 may be coupled with magnification of display text 60 and/or display graphic 70.

Hardware and Software Infrastructure Examples

The present invention may be embodied on various computing platforms that perform actions responsive to software-based instructions. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C#, C++ or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

CLAIM TERM GLOSSARY

Caching—storing data in electronic storage devices which may include, but are not limited to, magnetic hard drives, solid state drives, and/or RAM.

Desktop Background—the graphic user interface canvas underneath the pointing indicia. This may include commonly referenced "wall paper" such as static images but also is used in the context to include anything underneath the pointing indicia include software application windows, dialog boxes, media display windows and the like.

Fill—a body of a shape within the outline

Multi-touch—type of touchscreen event involving the user making contact with the surface of the screen at two or more points.

Pinch—type of touchscreen event involving the user making a two-point contact with the surface of the screen, and changing the distance between the points of contact while maintaining the contact Pointing indicia—a caret or cursor visual element that moves about the graphic user interface typically in response to a peripheral device, such as a mouse, track pad, touchscreen or the like Rasterized frame—a pixel image resulting from rasterization of a vector shape.

Rasterizing—a process of converting a vector shape into a pixel image that can be displayed on a video screen RGB—an additive color model in which red, green, and blue light are added together in various ways to reproduce a broad array of colors. In the context of the present invention a digital, 8-bit per channel triplet array is used as an exemplary embodiment.

Stroke—a line outlining a shape

Structured light scanner—a device for measuring the three-dimensional shape of an object using projected light patterns and a camera system, the device being capable to detect body movements and gestures.

System pointer identifier—an identifier, such as a handle, that lets the system determine which pointing indicium is being displayed at a current point in time Touch-drag—type of touchscreen event involving the user making a contact with the surface of the screen and maintaining the contact while sliding the contacting member along the screen surface Touch-flick—type of touchscreen event involving the user making a contact with the surface of the screen and then quickly sliding the contacting member along the screen surface and discontinuing the contact Touch-gesture pattern—type of touchscreen event involving the user making a contact with the surface of the screen and then sliding the contacting member in a predetermined pattern while maintaining the contact Touch-hold—type of touchscreen event involving the user making and maintaining a continuous contact with the surface of the screen for a predetermined period of time.

Touch-tap—type of touchscreen event involving the user making brief contact with the surface of the screen and immediately discontinuing the contact Touchscreen—a display device that allows a user to interact with a computing device by making contact with the surface of the screen.

User Input—is end user feedback, whether intentional (as in a command) or unintentional received by a computing device running the computer software application controlling the appearance of the pointing indicium.

Vector shape—a geometrical shape in computer graphics based on mathematical expressions

What is claimed is:

1. A method of displaying customized pointing indicia comprising the steps of:
    identifying a current system pointer identifier from an operating system's application program interface;
    accessing a stored collection of predefined pointing indicia vector shapes;
    selecting a predefined vector shape from the collection, the selected vector shape correlated to the current system pointer identifier;
    setting predetermined stroke attributes for the selected vector shape defining an outline thereof;
    rasterizing the selected vector shape; and
    displaying the rasterized vector shape.

2. The method of claim 1, further comprising the stroke attributes being selected from the group consisting of color, opacity, width, line cap, line join, and dashing.

3. The method of claim 1, further comprising setting predetermined fill attributes for the selected vector shape defining a body thereof prior to displaying the rasterized vector shape.

4. The method of claim 3, further comprising the step of detecting the RGB value of the background desktop under the pointing indicia and automatically recoloring the stroke color to provide distinct contrast between background desktop and stroke color.

5. The method of claim 4, wherein the stroke color differs from the fill color establishing a visibly distinct outline border around the pointing indicia.

6. The method of claim 1 further comprising the step of caching rasterized shapes for reuse.

7. The method of claim 1, wherein the stroke attributes are set responsive to user input.

8. The method of claim 7, further comprising the user input being selected from the group consisting of a key stroke, a mouse-wheel event, a mouse gesture, and a combination thereof.

9. The method of claim 7, wherein the user input is received via a touchscreen, the user input being selected from the group consisting of a touch-hold, a touch-tap, a touch-drag, a touch-flick, a pinch, a multi-touch, a touch gesture pattern, a stencil input, and a combination thereof.

10. The method of claim 7, wherein the user input is sensed by a structured light scanner, the user command being selected from the group consisting of a hand gesture, a body movement, a facial expression, and a combination thereof.

11. The method of claim 7, wherein the user input is a voice command received through a microphone.

12. A method of animating pointing indicia comprising the steps of:
   identifying a current system pointer identifier from an operating system's application program interface;
   accessing a stored collection of predefined pointing indicia vector shapes;
   selecting a predefined vector shape from the collection, the selected vector shape correlated to the current system pointer identifier;
   creating a set of rasterized frames of the selected vector shape, the rasterized frames having differing attributes; and
   sequentially displaying the rasterized frames for a predetermined duration, thereby creating an animated pointing indicia effect.

13. The method of claim 12, further comprising the attributes of the rasterized frames of the selected vector shape being selected from the group consisting of a stroke color, a stroke weight, a stroke opacity, a fill color, a fill opacity, a magnification level, and aspect ratios.

14. The method of claim 12, wherein at least one attribute of a subsequent rasterized frame differs from a preceding rasterized frame by a degree sufficient to produce a visual animated effect when the rasterized frames are displayed sequentially.

15. The method of claim 12, further comprising the step of caching rasterized shapes for reuse.

16. The method of claim 12, wherein the steps of creating a set of rasterized frames and rendering an animated pointing indicium by sequentially displaying the rasterized frames are performed responsive to user input.

17. The method of claim 16, further comprising the user input being selected from the group consisting of a key stroke, a mouse-wheel event, a mouse gesture, and a combination thereof.

18. The method of claim 16, wherein the user input is received via a touchscreen, the user input being selected from the group consisting of a touch-hold, a touch-tap, a touch-drag, a touch-flick, a pinch, a multi-touch, a touch gesture pattern, a stencil input, and a combination thereof.

19. The method of claim 16, wherein the user input is sensed by a structured light scanner, the user input being selected from the group consisting of a hand gesture, a body movement, a facial expression, and a combination thereof.

20. The method of claim 16, wherein the user input is a voice command received through a microphone.

\* \* \* \* \*